US008662362B1

(12) United States Patent
Bastian et al.

(10) Patent No.: US 8,662,362 B1
(45) Date of Patent: Mar. 4, 2014

(54) APPARATUS AND METHOD FOR SUPPORTING AND OPERATING AN ELECTRONIC DEVICE UPON A USER'S FOREARM

(71) Applicants: James W. Bastian, Fargo, ND (US); Thomas W. Bastian, Tucson, AZ (US)

(72) Inventors: James W. Bastian, Fargo, ND (US); Thomas W. Bastian, Tucson, AZ (US)

( * ) Notice: Subject to any disclaimer, the term of this patent is extended or adjusted under 35 U.S.C. 154(b) by 0 days.

(21) Appl. No.: 13/949,630

(22) Filed: Jul. 24, 2013

(51) Int. Cl.
*A45F 3/14* (2006.01)
*A45F 5/00* (2006.01)

(52) U.S. Cl.
CPC .............. *A45F 5/00* (2013.01); *A45F 2200/00* (2013.01)
USPC ........ 224/218; 224/197; 224/219; 248/205.2; 248/690

(58) Field of Classification Search
USPC .................. 248/205.2, 309.1, 346.04, 349.1, 248/221.11, 346.06, 690; 224/191, 197, 224/218, 219, 222, 242, 247, 267, 576, 901, 224/901.4, 660, 665, 671; 24/3.2
See application file for complete search history.

(56) References Cited

U.S. PATENT DOCUMENTS

| | | | | | |
|---|---|---|---|---|---|
| 3,550,824 | A | * | 12/1970 | Bohanski | 224/197 |
| 5,014,892 | A | * | 5/1991 | Copeland | 224/271 |
| 5,412,545 | A | * | 5/1995 | Rising | 224/197 |
| 5,850,996 | A | * | 12/1998 | Liang | 248/221.11 |
| 6,360,928 | B1 | * | 3/2002 | Russo | 224/218 |
| 7,942,293 | B2 | * | 5/2011 | Lawrence et al. | 224/218 |
| 8,328,055 | B1 | * | 12/2012 | Snyder | 224/197 |

* cited by examiner

*Primary Examiner* — Tan Le
(74) *Attorney, Agent, or Firm* — Dave Alan Lingbeck

(57) ABSTRACT

An apparatus and method for supporting and operating an electronic device upon a user's forearm for safeguarding the phone and providing immediate and convenient functional access to the phone. The apparatus and method for supporting and operating an electronic device upon a user's forearm includes an arm mount assembly including a curved arm mount being adapted to fit upon a user's forearm region, and also having a cushion member being attached to the arm mount, the arm mount assembly also including fastening members for fastening the arm mount to the user's forearm; a connector assembly in communication with the arm mount; and an electronic device holder rotatably supported by the connector assembly.

9 Claims, 5 Drawing Sheets

APPARATUS AND METHOD FOR SUPPORTING AND OPERATING AN ELECTRONIC DEVICE UPON A USER'S FOREARM

CROSS-REFERENCE TO RELATED APPLICATIONS

The present application claims the benefit of the U.S. provisional application Ser. No. 61/831,520, filed on Jun. 5, 2013, the disclosure of which is expressly incorporated by reference herein in its entirety.

BACKGROUND OF THE INVENTION

1. Field of the invention

The present invention relates to electronic device holders and more particularly pertains to a new apparatus and method for supporting and operating an electronic device upon a user's forearm for safeguarding the phone and providing immediate and convenient functional access to the phone.

2. Description of the Prior Art

The use of electronic device holders is known in the prior art. More specifically, electronic device holders heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a wrist-device which comprising a first module such as a personal computer and a second module consisting of a mobile telephone or a wireless telephone terminal which are coupled by means of elements in a bracelet configuration for holding the device to the forearm of the user, and wherein windows are provided in said modules for the passage of electronic connection buses between said modules. Another prior art includes a generally rectangular holder base and a holder configured to secure the mobile device therein. The holder may be removably attachable to the holder base. Another prior art includes an arm harness with a control panel for operating multiple electronic devices contained by the arm harness. In addition, another prior art includes a cell phone holder headband which enables the phone to stay in a normal talking position without having to hold it there with one hand. The cell phone is fit into an elastic band that is looped through a plastic plate. The plate is fitted to a swivel joint that is connected to one end of the headband. Yet, another prior art includes a releasable holder for a portable communication device including a base clip adapted to secure to a carrier such as a belt and an article clip adapted to secure to the portable communication device The base clip includes a channel having a bottom and side walls extending between open opposite ends with overlying flanges on both side walls spaced a selected distance from the channel bottom, and a locking tab extending into an opening in the channel bottom, a biasing member biasing the locking tab into the channel bottom opening. While these devices fulfill their respective, particular objectives and requirements, the aforementioned patents do not disclose a new apparatus and method for supporting and operating an electronic device upon a user's forearm.

SUMMARY OF THE INVENTION

The general purpose of the present invention, which will be described subsequently in greater detail, is to provide a new apparatus and method for supporting and operating an electronic device upon a user's forearm which has many of the advantages of the electronic device holders mentioned heretofore and many novel features that result in a new apparatus and method for supporting and operating an electronic device upon a user's forearm which is not anticipated, rendered obvious, suggested, or even implied by any of the prior art electronic device holders, either alone or in any combination thereof. The present invention includes an arm mount assembly including an curved arm mount being adapted to fit upon a user's forearm region and also having a cushion member, and also including a swivel assembly having a support member being disposed upon the top side of the curved arm mount, and also having a swivel joint being rotatable upon the support member, and further including an electronic device holder being mounted upon the swivel joint for rotation therewith. None of the prior art includes the combination of the elements of the present invention.

There has thus been outlined, rather broadly, the more important features of the apparatus and method for supporting and operating an electronic device upon a user's forearm in order that the detailed description thereof that follows may be better understood, and in order that the present contribution to the art may be better appreciated. There are additional features of the invention that will be described hereinafter and which will from the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new apparatus and method for supporting and operating an electronic device upon a user's forearm which has many of the advantages of the electronic device holders mentioned heretofore and many novel features that result in a new apparatus and method for supporting and operating an electronic device upon a user's forearm which is not anticipated, rendered obvious, suggested, or even implied by any of the prior art electronic device holders, either alone or in any combination thereof Still another object of the present invention is to provide a new apparatus and method for supporting and operating an electronic device upon a user's forearm for safeguarding the phone and providing immediate and convenient functional access to the phone.

Still yet another object of the present invention is to provide a new apparatus and method for supporting and operating an electronic device upon a user's forearm that allows the user to position the phone upon one's arm to facilitate the use thereof.

Even still another object of the present invention is to provide a new apparatus and method for supporting and operating an electronic device upon a user's forearm that is easy to attach to and detach from the user's arm and is positioned to not be an obstructive hindrance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
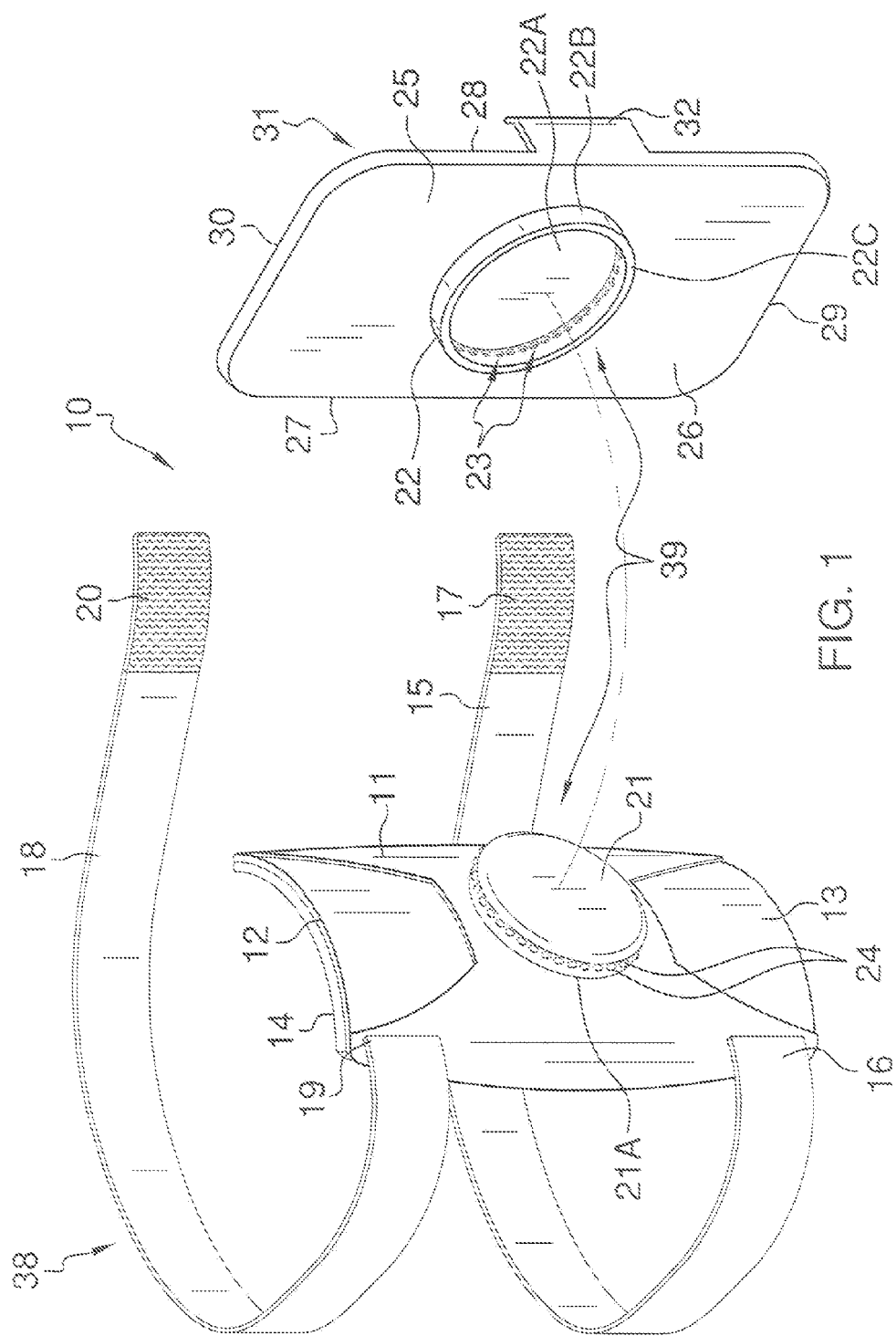
FIG. 1 is a partially exploded perspective view of a new apparatus and method for supporting and operating an electronic device upon a user's forearm according to the present invention.

With reference now to the drawings, and in particular to FIGS. 1 through 5 thereof, a new apparatus and method for supporting and operating an electronic device upon a user's forearm embodying the principles and concepts of the present invention and generally designated by the reference numeral 10 will be described.

As best illustrated in FIGS. 1 through 5, the apparatus and method for supporting and operating an electronic device upon a user's forearm 10 generally comprises an arm mount assembly 38 including a curved arm mount 11 made of a rigid material such as plastic and being laterally curved and adapted to fit upon a forearm 35 of a user. The curved arm mount 11 has a bottom side 12 and a top side 13 and also rounded corners. A cushion member 14 may be affixed with adhesive to the bottom side 12 of the curved arm mount 11 and has a dimension that substantially covers the entire bottom side 12 with the cushion member 14 being moisture permeable. A pair of fastening members 15,18 or straps or elastic bands are used to secure the curved arm mount 11 to the user's forearm 35, and the fastening members 15,18 may include first ends 16,19 which are securely and conventionally attached to the top side 13 of the curved arm mount 11 near a side edge and at opposed ends of the curved arm mount 11, and may also include second ends 17,20 which are fastenable with hook and loop fasteners to the respective fastening members 15,18 to secure the curved arm mount 11 upon the user's forearm 35.

As shown in FIG. 1, the uppercuts for supporting and operating an electronic device upon a user's forearm 10 also comprises a connector assembly 39 including a support member 21 securely and conventionally attached centrally to the top side 13 of the curved arm mount 11, and also including a swivel joint 22 being rotatable upon and about the support member 21. The swivel joint 22 may be freely rotatable upon the support member 21 or the swivel joint 22 may be lockable at selected rotatable positions. The swivel joint 22 and the support member 21 may have a ratcheted assembly such as mateable dimples 23 or slots and nodes 24 conventionally spaced about the circumference of the swivel joint 22 and the support member 21. The support member 21 may be a disk or a boss having a side wall 21A with the nodes 24 conventionally attached to and spacedly arranged in a row about an outer side of the side wall 21A. The swivel joint 22 may be a cap having a top wall 22A and a side wall 22B depending from the top wall 22A with the dimples 23 or slots being disposed in an inner side of the side wall 22B and spacedly arranged in a row about the side wall 22B. The swivel joint 22 may also include an annular lip 22C integral to a bottom edge of the side wall 22B and being engageable to the support member 21 for retaining the swivel joint 22 to the support member 22. The spaces between the dimples 23 or slots and the spaces between the nodes 24 are substantially equivalent so that each node 24 will be removably received and engaged in a respective dimple 23 or slot.

Figure 2:
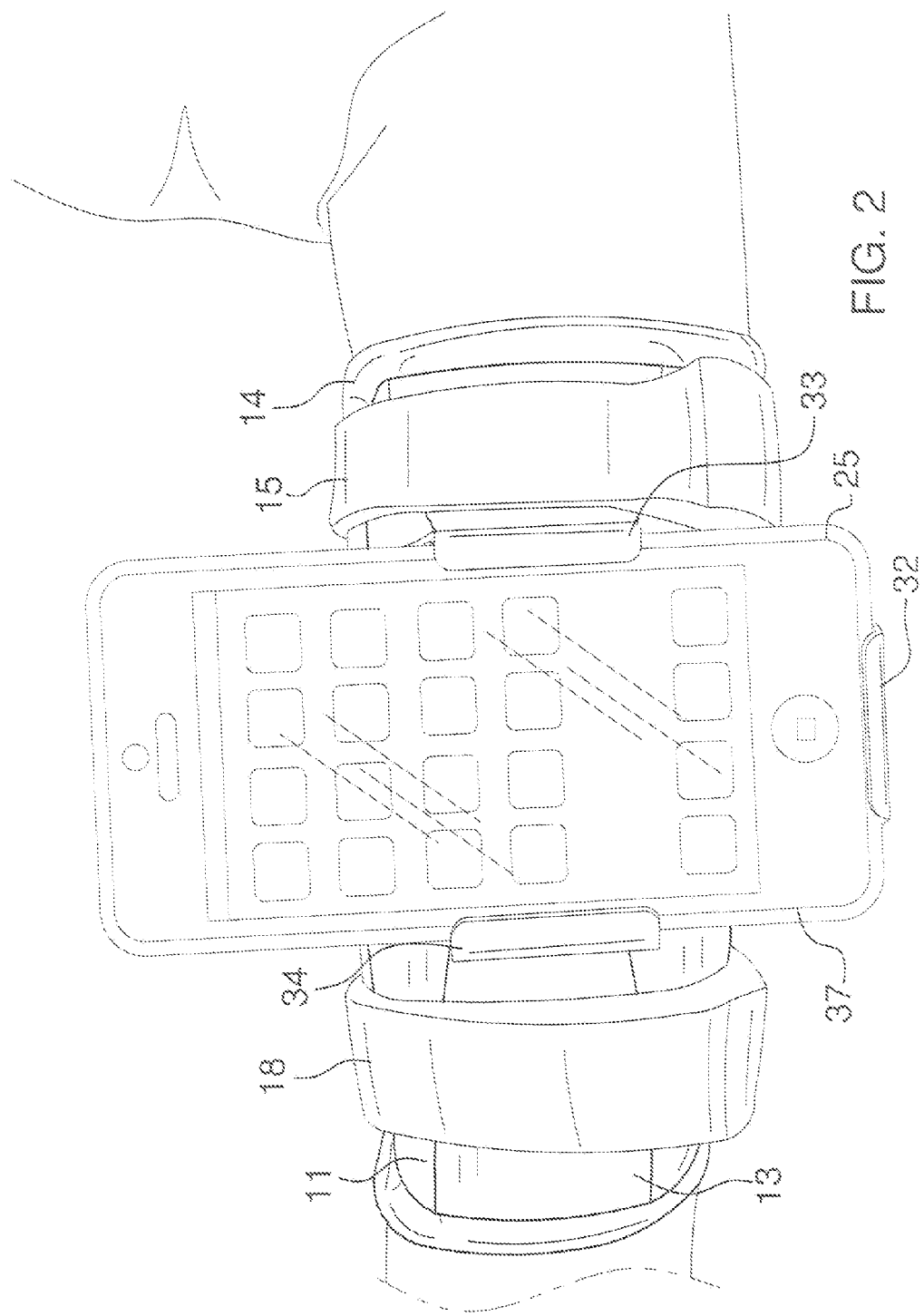
FIG. 2 is a perspective view of the present invention in use.
Figure 3:
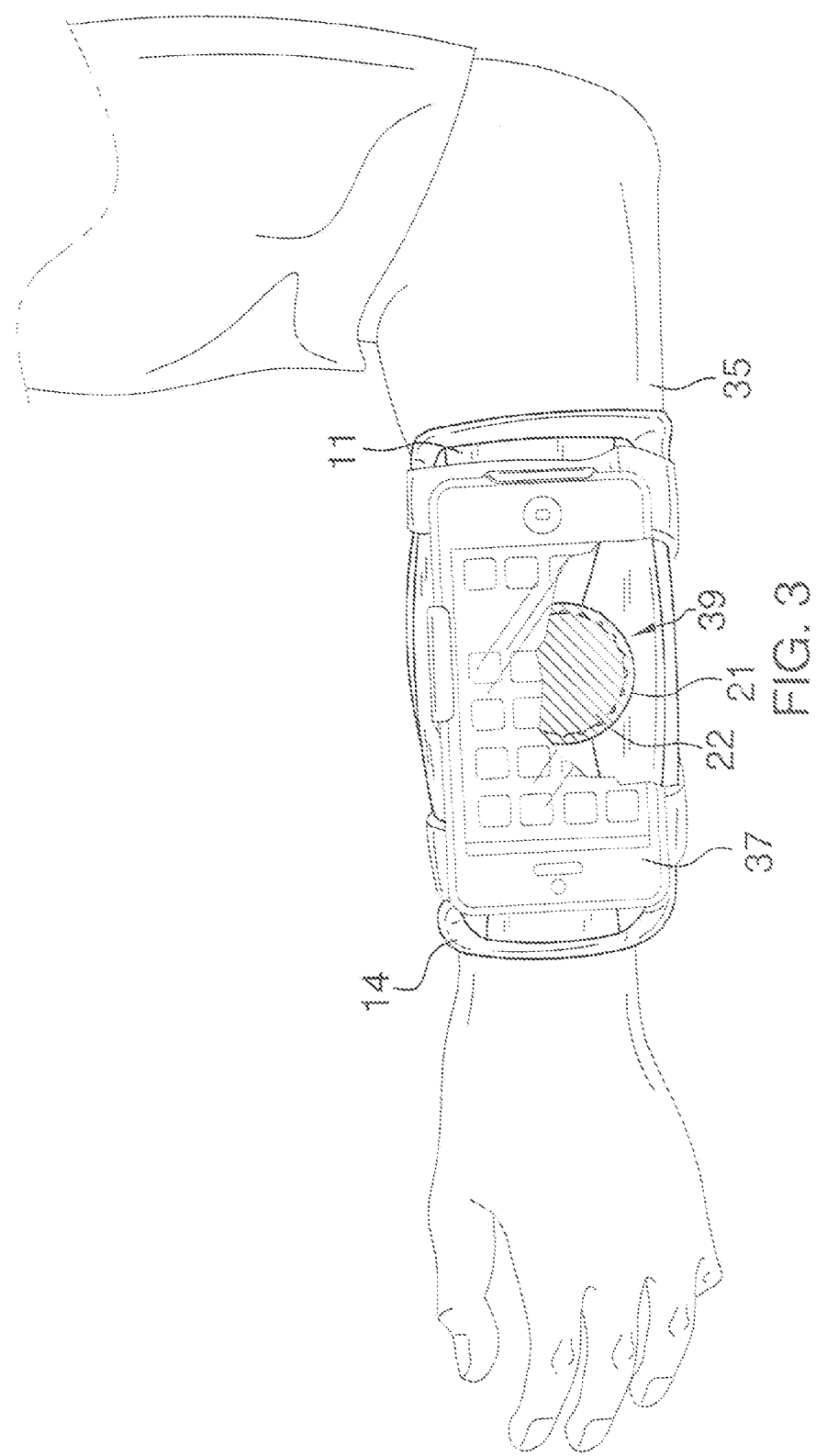
FIG. 3 is another perspective view of the present invention in use with a partial cutaway showing the connector assembly.

As illustrated in FIGS. 1-3, an electronic device holder 25 is securely and conventionally attached to the swivel joint 22 for rotation therewith. The electronic device holder 25 has a back wall 26, sides 27,28, a bottom end 29, an open front 31, an open top end 30, and also flanges 32-34 or tabs being integral to the sides 27,28 and to the bottom end 29 with the flanges 32-34 or tabs being spaced from the back wall 26 and extending inwardly from the sides 27,28 and the bottom end 29. The back wall 26 of the electronic device holder 25 is securely and conventionally attached to the swivel joint 22. The electronic device holder 25 has a dimension which is similar to that of the curved arm mount 11 and is adapted to engageably receive an electronic device 37 preferably an iPhone5 through the open top end 30 between the flanges 32-34 or tabs and the back wall 26 of the electronic device holder 25 to securely retain the phone 37 to the electronic device holder 25.

Figure 4:
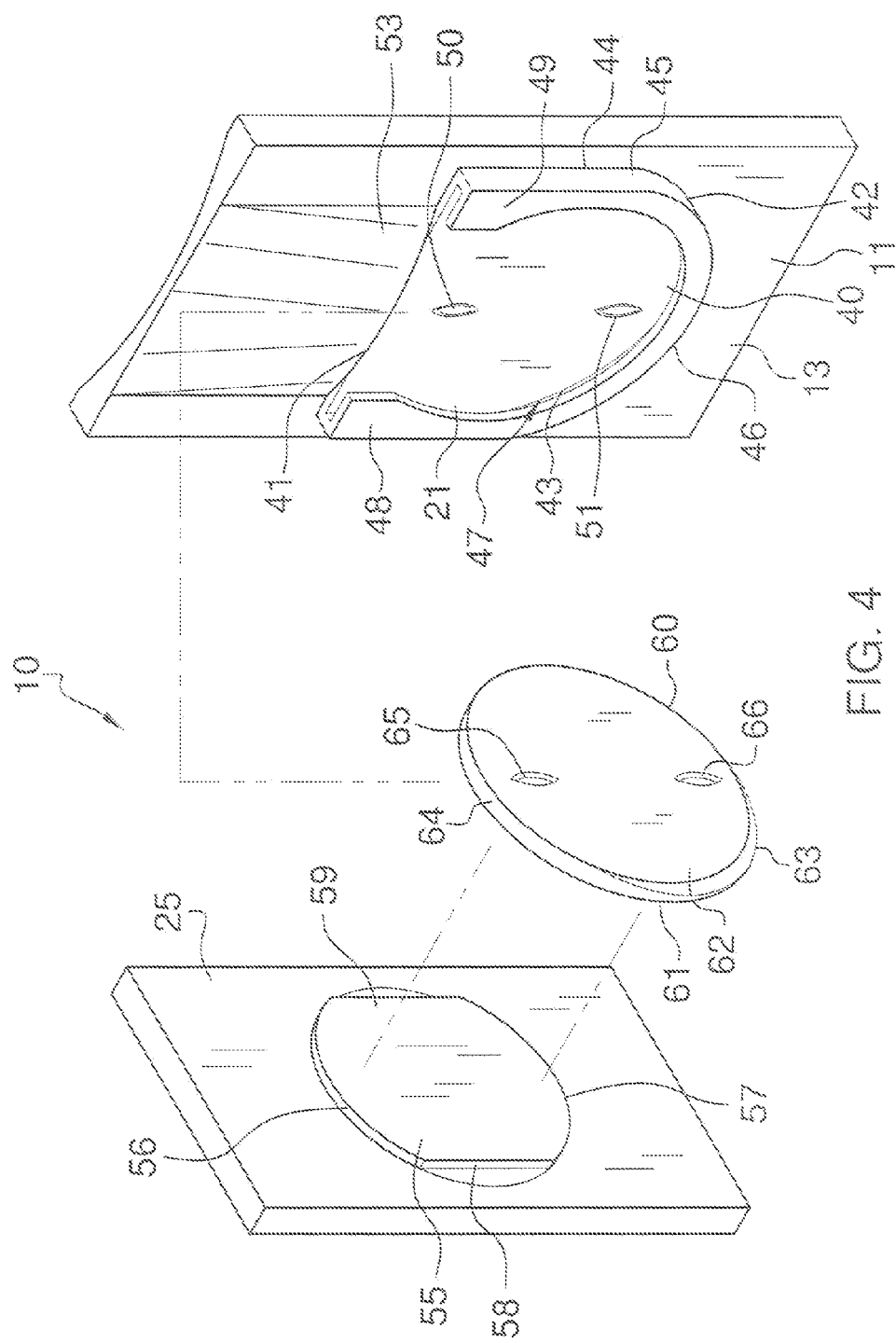
FIG. 4 is a partially explode perspective view of a second embodiment of the present invention.
Figure 5:
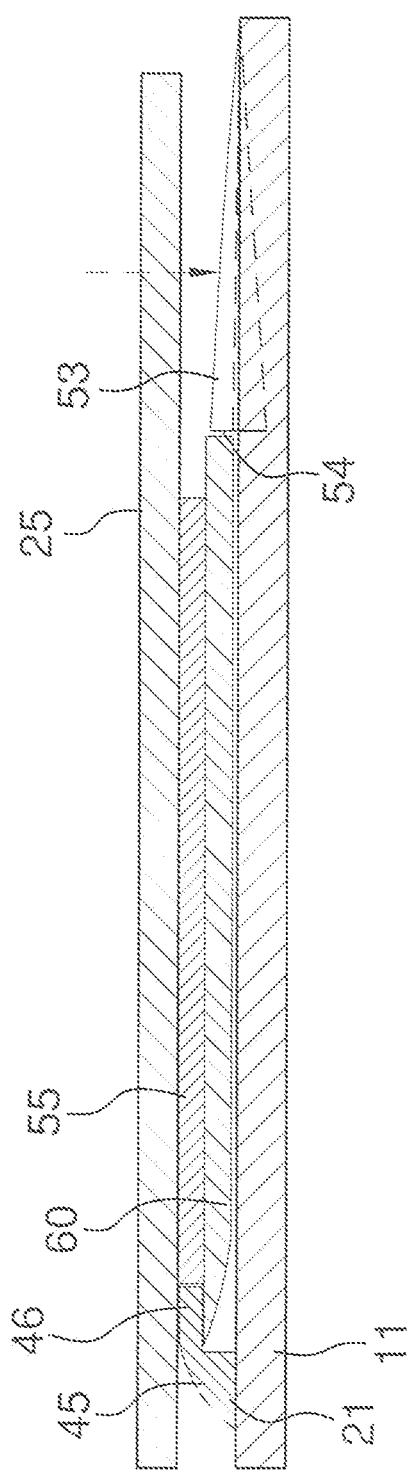
FIG. 5 is a side cross sectional view of the second embodiment of the present invention.

As shown in FIGS. 2, 4 & 5, a second embodiment of the connector assembly 39 includes the support member 21 having a bottom wall 40 conventionally attached to the topside 13 of the curved arm mount 11 and having a front edge 41, a convexly curved back edge 42, and side edges 43,44 with a rail 45 conventionally attached to a top of the bottom wall 40 and extending along the curved back 42 and side edges 43 and also with a lip 46 integral to a top of the tail 45 and extending inwardly thus forming a groove 47 between the lip 46 and the bottom wall 40. The lip 46 also has lugs 48,49 integral to and at the ends of the rail 45 at the front edge 41 of the bottom wall 40. The lugs 48,49 project inwardly of the support member 21. In addition, the support member 21 has ribs 50,51 centrally disposed in the top of the bottom wall 40 and longitudinally aligned and spaced from the back edge 42 to the front edge 41 of the bottom wail 40. A biased and depressible ramp 53 is conventionally secured upon the top side 13 of the arm mount 11 forward of and adjacent to the support member 21 and has a back edge 54 biasedly extending higher than the front edge 41 of the support member 21, but when depressed, the back edge 54 of the biased ramp 53 aligns with the front edge 41 of the support member 21. The biased ramp 53 may be made of rigid material and may be a leaf spring. The swivel joint 22 of the second embodiment includes a truncated cylindrical member 55 having a thickness and also having back 56, front 57 and side edges 58,59. The front and back edges 56,57 are convexly curved and the opposed side edges 58,59 are truncated. The truncated cylindrical member 55 is conventionally attached to a bottom side of the electronic device holder 25. The swivel joint 22 further includes a connector member 60 being disc-shaped and made of rigid material and having a planar bottom side 62 and a planar top side 61 and also having a circumferential tapered front edge portion 63 with the taper being from the top side 61 to the bottom side 62 and has a circumferential vertically straight back edge portion 64 which is perpendicular to the planar top side 61 and to the planar bottom side 62 of the connector member 60. The top side 61 of the connector member 60 is conventionally attached to a bottom side of the truncated cylindrical member 55 and is removably received in the support member 21. Elongate notches 65,66 may be centrally disposed in the bottom side 62 of the connector member 60 with the elongate notches 65,66 being longitudinally aligned with one another and spaced from the back edge portion 64 to the front edge portion 63 and is arranged to match the ribs 50,51 to effectively retain the connector member 60 in and upon the support member 21 with the longitudinal axis of the electronic device holder being parallel to the longitudinal axis of the curved arm mount 11.

In use as shown in FIGS. 2 & 3, the user can rotate the electronic device including the phone 37 to be viewed in a portrait or a landscape position as desired by the user bending one's arm at the elbow so that the longitudinal axis of the electronic device holder 25 as measured from the bottom end 29 to the open top end 30 is angled relative to the longitudinal axis of the curved arm mount 11 as measured lengthwise of the curved arm mount 11 In addition, when not using the electronic device or phone 37, the sure can rotate the electronic device or phone 37 so that the longitudinal axis of the electronic device holder 25 is parallel to the longitudinal axis of the curved arm mount 11. As to the second embodiment, the electronic device holder 25 and the phone 37 can still be rotated as desired and can also be completely removed from the arm mount 11. To secure the electronic device holder 25 to the arm mount 11, the user can slide the connector member 60 upon and depressing the biased ramp 53 and into the support member 21 at the front edge 41 of the support member 21 with either the tapered front edge portion 63 of the connector member 60 or the vertically straight back edge 64 facing the support member 21 as the user slides the connector member 60 into the support member 21. Once the connector member 60 is fully received within the support member 21, the biased ramp 53 biases upwardly above the front edge 41 of the support member 21 with the vertically straight back edge 64 of the connector member 60 being engageable with the biased ramp 53 to prevent the removal of the connector member 60. The lugs 48,49 also prevent the removal of the connector member 60 from the support member 21 should the user rotate the electronic device holder 25 more or less than 180 degrees with either of the truncated side edges 58,58 of the truncated cylindrical member 55 facing or being parallel to the front edge 41 of the support member 21. To remove the electronic device holder 25 from the arm mount 11, the user rotates the electronic device holder 25 so that the tapered front edge portion 63 faces the back edge 54 of the biased ramp 53 and the user then slides the connector member 60 out of the support member 21 with the tapered front edge portion 63 of the connector member 60 depressing the biased ramp 53.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the apparatus and method for supporting and operating an electronic device upon a user's forearm. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for supporting and operating an electronic device upon a user's forearm comprising:
    an arm mount assembly including a curved arm mount being adapted to fit upon a user's forearm region, and also including fastening members for fastening the arm mount to the user's forearm, wherein the arm mount is a laterally curved plate having a top side and a bottom side;
    a connector assembly in communication with the arm mount, wherein the connector assembly includes a support member attached to the top side of the curved plate, and also includes a swivel joint being selectively rotatable upon the support member, wherein the support member has an annular side wall and the swivel joint has a top wall, an annular side wall depending from the top wall and a lip disposed along a bottom edge of the annular side wall of the swivel joint for retaining the swivel joint to the support member, the annular side wall of the swivel joint having a greater circumference than that of the annular side wall of the support member; and
    an electronic device holder rotatably supported by the connector assembly and rotatable relative to the arm mount.

2. An apparatus for supporting and operating an electronic device upon a user's forearm comprising:
    an arm mount assembly including a curved arm mount being adapted to fit upon a user's forearm region, and also including fastening members for fastening the arm mount to the user's forearm, wherein the arm mount is a laterally curved plate having a top side and a bottom side;
    a connector assembly in communication with the arm mount, wherein the connector assembly includes a support member attached to the top side of the curved plate, and also includes a swivel joint being selectively rotatable upon the support member, wherein the support member has a bottom wall attached to the top side of the arm mount and has a front edge, a convexly curved back edge, and side edges with a rail attached to a top of the bottom wall and extending along the curved back and side edges and also with a lip integral to a top of the rail and extending inwardly thus forming a groove between the lip and the bottom wall, and further with ribs being aligned and spaced upon the top of the bottom wall to retain the connector member to the support member; and
    an electronic device holder rotatably supported by the connector assembly and rotatable relative to the arm mount.

3. The apparatus for supporting and operating an electronic device upon a user's forearm as described in claim 2, wherein the lip also has lugs integral to and at the ends of the rail at the front edge of the bottom wall with the lugs projecting inwardly of the support member.

4. The apparatus for supporting and operating an electronic device upon a user's forearm as described in claim 2, wherein the connector assembly has a biased and depressible ramp being secured upon the top side of the arm mount forward of the support member and having a back edge biasedly extending higher than the front edge of the support member, but when depressed the back edge of the biased ramp aligning with the front edge of the support member.

5. The apparatus for supporting and operating an electronic device upon a user's forearm as described in claim 1, wherein the swivel joint includes a truncated cylindrical member having a thickness and also having back, front and side edges with the front and back side edges being convexly curved and the opposed side edges being truncated, the truncated cylindrical member being attached to a bottom side of the electronic device holder.

6. The apparatus for supporting and operating an electronic device upon a user's forearm as described in claim 5, wherein the swivel joint further includes a connector member being disc-shaped and having a planar bottom side and a planar top side and also having a tapered circumferential front edge portion and having a vertically straight circumferential back edge portion which is perpendicular to the planar top side and planar bottom side of the connector member to prevent removal of the electronic device holder from the arm mount.

7. The apparatus for supporting and operating an electronic device upon a user's forearm as described in claim 6, wherein the top side of the connector member is attached to a bottom side of the planar member and is removably received in the support member, the connector member further having notches aligned and spaced in the bottom side of the connector member to retain the connector member to the support member.

8. A method for supporting and operating an electronic device upon a user's forearm comprising:
providing a curved arm mount, a connector assembly, and an electronic device holder, wherein the step of providing a connector assembly includes providing a support member which is attached to the curved arm mount and also providing a swivel joint attached to the electronic device holder;
removably securing the curved arm mount upon a user's forearm;
inserting an electronic device including a phone to the electronic device holder and connecting the swivel joint to the support member;
rotating the phone relative to the user's forearm and arm mount as desired to position the phone; and
disconnecting the swivel joint from the support member to remove the electronic device holder from the curved arm mount without removing the curved arm mount from about the user's forearm as desired by the user, wherein the step of disconnecting the swivel joint includes rotating the swivel joint so that a tapered front edge portion of the swivel joint faces a back edge of a biased ramp adjacent to the support member.

9. The method for supporting and operating an electronic device upon a user's forearm as described in claim 8, wherein the step of rotating the swivel joint includes depressing the biased ramp adjacent to the support member to unblock the swivel joint and allow for the removal of the electronic device holder from the arm mount.

* * * * *